(12) United States Patent
McCown et al.

(10) Patent No.: US 10,963,582 B1
(45) Date of Patent: Mar. 30, 2021

(54) APPARATUS AND METHOD FOR ENABLING OWNER AUTHORIZED MONITORED STEWARDSHIP OVER PROTECTED DATA IN COMPUTING DEVICES

(71) Applicant: Anonyome Labs, Inc., Draper, UT (US)

(72) Inventors: Steven Harvey McCown, Mapleton, UT (US); Paul Ashley, Toowong (AU); John David Mumford, Portola Valley, CA (US); Steve Shillingford, Draper, UT (US); Greg Clark, San Francisco, CA (US)

(73) Assignee: ANONYOME LABS, INC., Salt Lake City, UT (US)

( * ) Notice: Subject to any disclaimer, the term of this patent is extended or adjusted under 35 U.S.C. 154(b) by 221 days.

(21) Appl. No.: 16/149,998

(22) Filed: Oct. 2, 2018

Related U.S. Application Data

(60) Provisional application No. 62/725,139, filed on Aug. 30, 2018.

(51) Int. Cl.
*G06F 21/62* (2013.01)
*H04L 29/06* (2006.01)

(52) U.S. Cl.
CPC ........ *G06F 21/6218* (2013.01); *H04L 63/083* (2013.01); *H04L 63/30* (2013.01)

(58) Field of Classification Search
CPC .... G06F 21/6218; H04L 63/083; H04L 63/30

USPC ........................................................ 713/168
See application file for complete search history.

(56) References Cited

U.S. PATENT DOCUMENTS

| 9,372,987 | B1 | 6/2016 | Ashley et al. | |
|---|---|---|---|---|
| 9,374,689 | B1 | 6/2016 | Ashley et al. | |
| 9,703,986 | B1 | 7/2017 | Ashley et al. | |
| 9,729,519 | B1 | 8/2017 | Ashley et al. | |
| 10,178,106 | B1 | 1/2019 | Ashley et al. | |
| 10,320,753 | B1 | 6/2019 | Ashley et al. | |
| 2020/0034553 | A1* | 1/2020 | Kenyon | H04L 9/3239 |
| 2020/0076602 | A1* | 3/2020 | Redpath | H04L 9/3218 |

* cited by examiner

*Primary Examiner* — Kambiz Zand
*Assistant Examiner* — Benjamin A Kaplan
(74) *Attorney, Agent, or Firm* — Cooley LLP

(57) ABSTRACT

A machine has a network interface circuit to provide connectivity to networked machines. A processor is connected to the network interface circuit. A memory is connected to the processor and the network interface circuit. The memory stores cryptographically protected data, a data access policy and a steward group specifying individuals to administer the data access policy. The memory stores instructions executed by the processor to receive a request to access the cryptographically protected data. Authentication tokens from individuals in the steward group are collected. It is determined that the authentication tokens satisfy the data access policy to establish a data access state. A decrypted version of the cryptographically protected data is supplied to one or more of the networked machines to establish a transaction. The transaction is recorded with a distributed ledger associated with at least a subset of the networked machines.

8 Claims, 10 Drawing Sheets

```
{
        "id" : "5F645267556B58703273357638792F42",
        "groupName" : "Trusted Identity Group",
        "stewards" : [
                    "steward1" : "3D4E645267556B58703273357538782F",
                    "steward2" : "23294A404E635266556A586E32723475",
                    "steward3" : "484226452948404D635166546A576E5A",
                    "steward4" : "EA38792F423F4528482B4D6251655468",
                    "steward5" : "6472357538782F413F4428472B4B6250"
        ],
        "stewardsRequiredToInvoke" : "5",
        "protectedInformationDescription" : "Application AES key",
        "invocationActionStep" :  "Return to all Stewards",
        "notifyTrustedIdentity" : "yes",
        "loggingBlockchainID" : "35586E5A72347537782141254 42A472D",
        "multiuseInvocation" : "no"
        "tokenReceiptTimeframe" : "1 day"
}
```

FIG. 4

US 10,963,582 B1

APPARATUS AND METHOD FOR ENABLING OWNER AUTHORIZED MONITORED STEWARDSHIP OVER PROTECTED DATA IN COMPUTING DEVICES

CROSS-REFERENCE TO RELATED APPLICATION

This application claims priority to U.S. Provisional Patent Application Ser. No. 62/725,139, filed Aug. 30, 2018, the contents of which are incorporated herein by reference.

FIELD OF THE INVENTION

This invention relates generally to communications in computer networks. More particularly, this invention is directed towards techniques for enabling owner authorized monitored stewardship over protected data in computing devices.

BACKGROUND OF THE INVENTION

The invention is disclosed in the context of the following definitions:

Blockchain: is a continuously growing list of records, called blocks, which are linked and secured using cryptography. Each block typically contains a cryptographic hash of the previous block, a timestamp and transaction data. By design, a blockchain is inherently resistant to modification of the data. It is an open, distributed ledger that can record transactions between two parties efficiently and in a verifiable and permanent way. For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. (Source: https://en.wikipedia.org/wiki/Blockchain)

Identity: "The characteristics determining who or what a person or thing is." (Source: Oxford Dictionary)

Protected Data: Comprises data or information being controlled within a Trusted Identity System. Examples may include: encryption keys, personal information, or other non-public data.

Protected Data Activation Token: A unique cryptographic token generated for and assigned to one specific Trusted Identity Steward. This token will enable the Trusted Identity Steward to submit a command (together with the token) to a computing device that is protected by the Trusted Identity System. Upon receipt and validation, the Trusted Identity System will invoke or activate the target's Protected Data Security Mechanism Activation Sequence. These are normally one-time-use tokens, but multi-use embodiments may exist.

Protected Data Security Mechanism: A cryptographic access control mechanism, or specification thereof, that controls access to Protected Data stored on data storage systems. This mechanism contains owner-defined access requirements, validates access requests and credentials, controls how access to Protected Data is granted, and controls events that occur to the Protected Data upon validated access control requests.

Protected Data Security Mechanism Activation Sequence: the steps specified as a part of the Protected Data Security Mechanism that are to be carried out when a Protected Data Activation Mechanism is activated. Sequences may include commands necessary to retrieve, transmit, copy, destroy, etc. the Protected Data. Additionally, if Protected Data is an executable computer file, then the Protected Data Activation Sequence may launch the specified executable computer file.

Trusted Identity: The basic end-user role within a Trusted Identity System. A Trusted Identity provides Protected Data to be controlled by a Trusted Identity Steward Group.

Trusted Identity Blockchain: A blockchain or immutable ledger to which are written the activities, agreements, events, identities, members, etc. that participate in the Trusted Identity System operations. This blockchain or ledger contains a verifiable history, timing, and sequence of Trusted Identity System events, which may be used for subsequent verification and validation activities. This blockchain or immutable ledger may be publicly accessible, or it may be private depending on the specific motivation and implementation of the Trusted Identity System. Although termed as 'blockchain' in the singular, some embodiments may employ multiple blockchains or protected storage services.

Trusted Identity Steward Group: A group of Trusted Identity Stewards collaborating to manage permissioned access (in compliance with the Protected Data Security Mechanism) to Protected Data.

Trusted Identity Steward Group Manager: The Trusted Identity Steward that created Trusted Identity Steward Group or the Trusted Identity Stewart that currently manages the Trusted Identity Steward Group (e.g., in the event that the manager had changed).

Trusted Identity Steward: One of the participants within a Trusted Identity Steward Group that helps control the granting of access to the Protected Data.

Trusted Identity Server: The server or set of servers implementing the server-side functionality (e.g., management, enrollment, etc.) of the Trusted Identity System.

Trusted Identity System: The system providing trusted and permissioned control of Protected Data of a Trusted Identity. The Trusted Identity System also ensures that the actions specified by the Protected Data Security Mechanism Activation Sequence are carried out upon invocation by the Trusted Identity Steward Group.

Trusted Identity System Application Software: The software (e.g., executable computer code, software development kit, application program interface, etc.) implementing methods whereby the end-user (and their computing devices) interacts with the Trusted Identity System, the Trusted Identity Stewards interact with the end-user's devices, the components managing the Protected Data, etc. This set of components is installed on the end-user's computing devices and operates within that environment within the end-user's control. The Trusted Identity System Application Software components may be installed on desktop operating systems (e.g., Windows®, MacOS®, Linux®, etc.), mobile environments (e.g., iOS®, Android®, etc.) and may operate on a wide range of hardware (e.g., desktop, mobile, embedded, 'internet of things', etc.)."

The laws of governments provide law enforcement organizations with the authority to investigate crimes and criminal activity in order to keep society safe from wrongdoing, criminals, terrorists, etc. Along with the investigative authority, the laws of governments also provide rules, regulations, and restrictions as to how governmental entities (e.g., law enforcement) may conduct investigations. The balance between the authority and limitations of the investigative processes is further defined by a nation's legal code.

As an example of the balance between legal authority and personal rights, the Fourth Amendment to the United States Constitution guarantees its citizens the right to be secure against unreasonable searches and seizures (e.g., by law enforcement) unless a legal and lawful warrant has been issued by a court of law. Such a warrant must outline the details of what is being sought and potentially seized. The checks and balances covering the warrant process stipulate that while warrants may be requested by law enforcement, they must also be approved by the governing court of law. Without the concurrence of the court of law, no search is authorized and may not be performed. The express intent of this process is to balance the desires of law enforcement with the rights of the people, which is that citizens must be free from searches of their persons, houses, papers, and effects unless probable causes has been demonstrated to the satisfaction of the court.

Upon issuance of a valid warrant in the physical world, law enforcement may open (or break through) the front door of a person's residence in order to search for and retrieve items authorized by the warrant. However, in the digital world where data is often protected by encryption, the issuance of a valid warrant alone does not provide law enforcement with the technical capability to decrypt and access data authorized by the warrant. Law enforcement agencies have complained that the use of encryption prohibits them from conducting legally authorized search activities. This has led law enforcement agencies to demand that encryption circumvention methods, such as key escrow, be mandated by law so that they can perform their investigative functions.

If an encrypted disk or data store is discovered during an investigation and the decryption key is not present, then law enforcement agencies will not be able to decrypt the encrypted data, which may hinder the investigation. Nevertheless, while the use of data encryption can hinder legal investigations, privacy rights groups are also observing that current methods of circumventing encryption (e.g., key escrow) upon obtaining a valid warrant could also be used illegally (e.g., without a warrant) or that they could be otherwise be abused by rogue or malicious employees. Privacy rights groups further argue that any encryption circumvention method that is inserted into the encryption process could also be illegally exploited by computer hackers to break into encrypted data systems or that such circumvention could be accidentally triggered by unforeseen computer errors. Since illegal abuse of systems by malicious employees, computer intrusions by hackers, and numerous computer errors have all been demonstrated, it is abundantly clear that personal data is not safe if contemporary encryption circumvention architectures are deployed.

SUMMARY OF THE INVENTION

A machine has a network interface circuit to provide connectivity to networked machines. A processor is connected to the network interface circuit. A memory is connected to the processor and the network interface circuit. The memory stores cryptographically protected data, a data access policy and a steward group specifying individuals to administer the data access policy. The memory stores instructions executed by the processor to receive a request to access the cryptographically protected data. Authentication tokens from individuals in the steward group are collected. It is determined that the authentication tokens satisfy the data access policy to establish a data access state. A decrypted version of the cryptographically protected data is supplied to one or more of the networked machines to establish a transaction. The transaction is recorded with a distributed ledger associated with at least a subset of the networked machines.

BRIEF DESCRIPTION OF THE FIGURES

FIG. 4 illustrates an example of a JSON encoding of the details of a Protected Data Security Mechanism.

DETAILED DESCRIPTION OF THE INVENTION

The Trusted Identity System provides a system and method whereby a Trusted Identity designates (or consents to) Protected Data to be stored internally within their end-user devices (or systems they otherwise control) and simultaneously be available for permissioned retrieval by a Trusted Identity Steward Group to which the Trusted Identity has previously granted permissioned and conditional access to the Protected Data.

Figure 1:
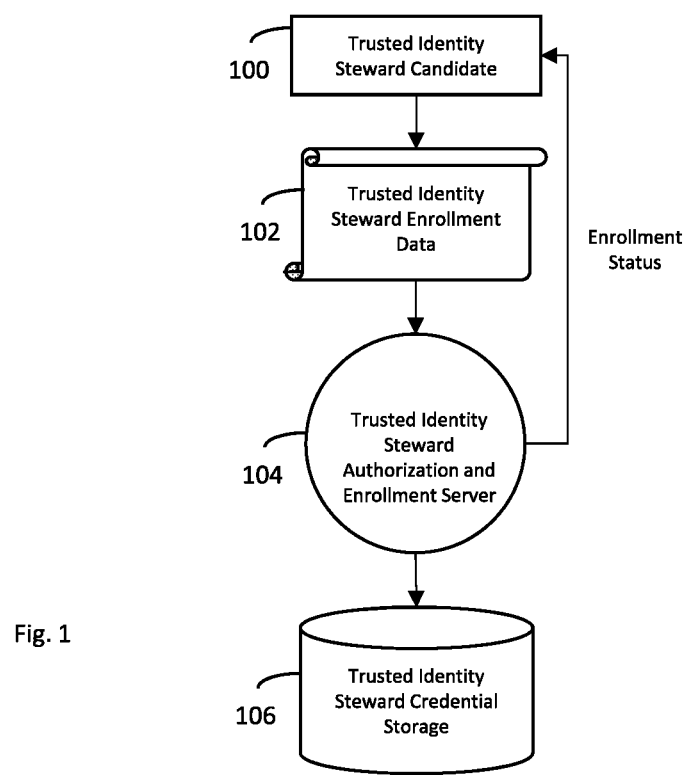
FIG. 1 illustrates the high-level process for enrolling Trusted Identity Stewards (e.g., law enforcement, courts, friends, etc.)

FIG. 1 is a high-level characterization of enrolling Trusted Identity Stewards. A Trusted Identity Steward Candidate is prompted for Trusted Identity Steward Enrollment Data 102. For example, the prompts may be supplied by a client application executing on a client device. The client device then uses one or more wired and/or wireless network connections to upload the data to Trusted Identity Steward Authorization and Enrollment Server 104. The server 104 may have an associated data store 106 for Trusted Identity Steward Credential Storage.

Figure 2:
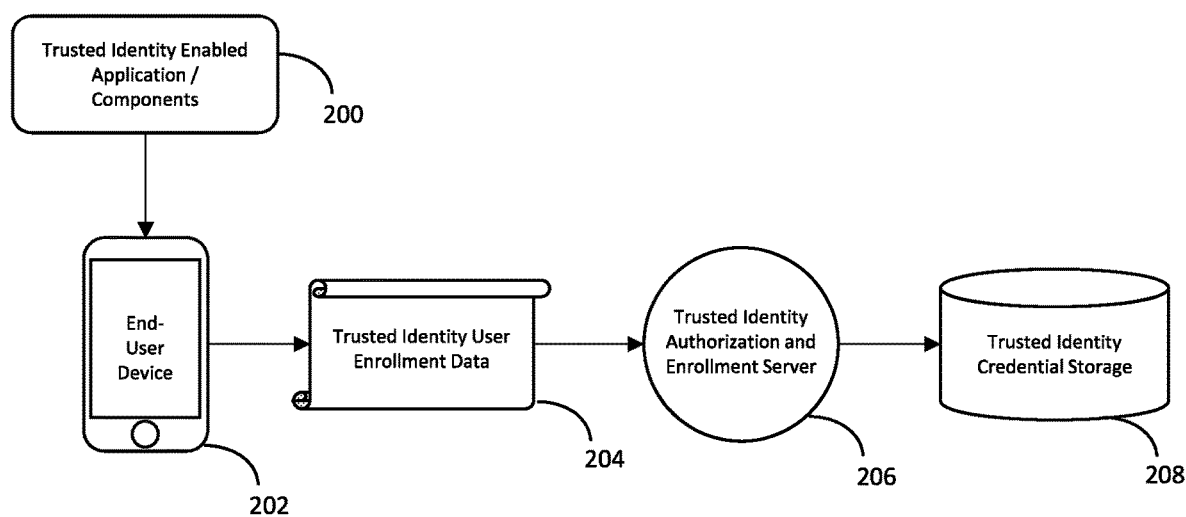
FIG. 2 illustrates the high-level process for enrolling a user device in the Trusted Identity System using a centralized storage system.

FIG. 2 is a high-level characterization of enrolling a user device in the Trusted Identity System. A Trusted Identity client application 200 is loaded on to an end-user device 202. The client application 200 prompts the user for Trusted Identity User Enrollment Data 204. The client device 202 uses wired and/or wireless network connections to upload the data to a Trusted Identity Authorization and Enrollment server 206, which may have associated Trusted Identity Credential Storage 208. The Trusted Identity Credential Storage 208 may be part of server 206 or it may be a different machine in network connection with server 206.

Figure 3:
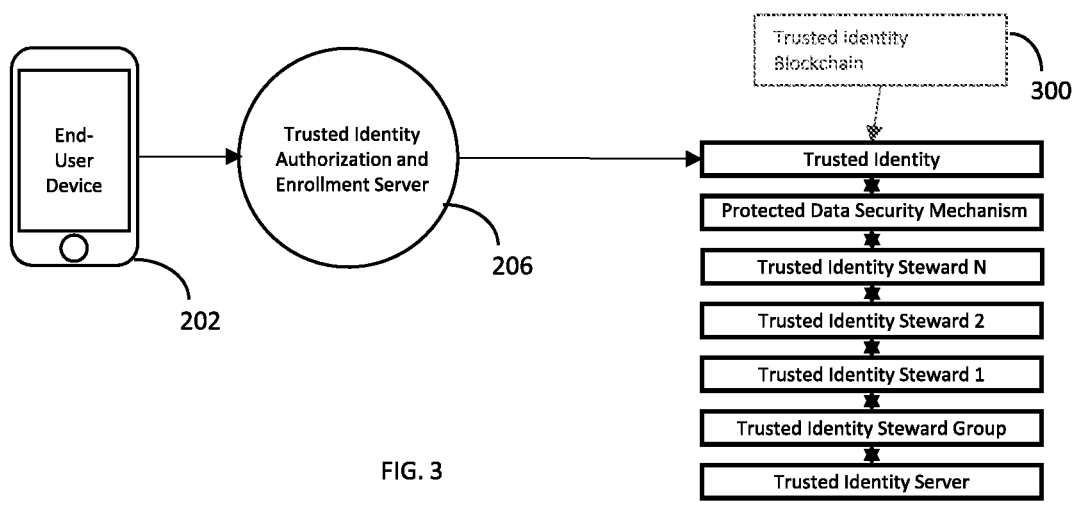
FIG. 3 illustrates the high-level process for enrolling a user device in the Trusted Identity System using a blockchain for storage.

FIG. 3 illustrates enrolling a user device into a Trusted Identity System using a Trusted Identity Blockchain 300.

The figure illustrates the end-user device 202 and Trusted Identity Authorization and Enrollment Server 206. The user at device 202 is prompted for information, which is stored in the server 206. In this embodiment, the Trusted Identity Blockchain 300 includes a Trusted Identity, a Trusted Identity Group Contact, and a listing of Trusted Identity Stewards 1 through N. It may also include a Trusted Identity Steward Group and a Trusted Identity Server identifier. FIG. 4 is an example of JSON encoded Trusted Identity Steward Group contact details.

Figure 5:
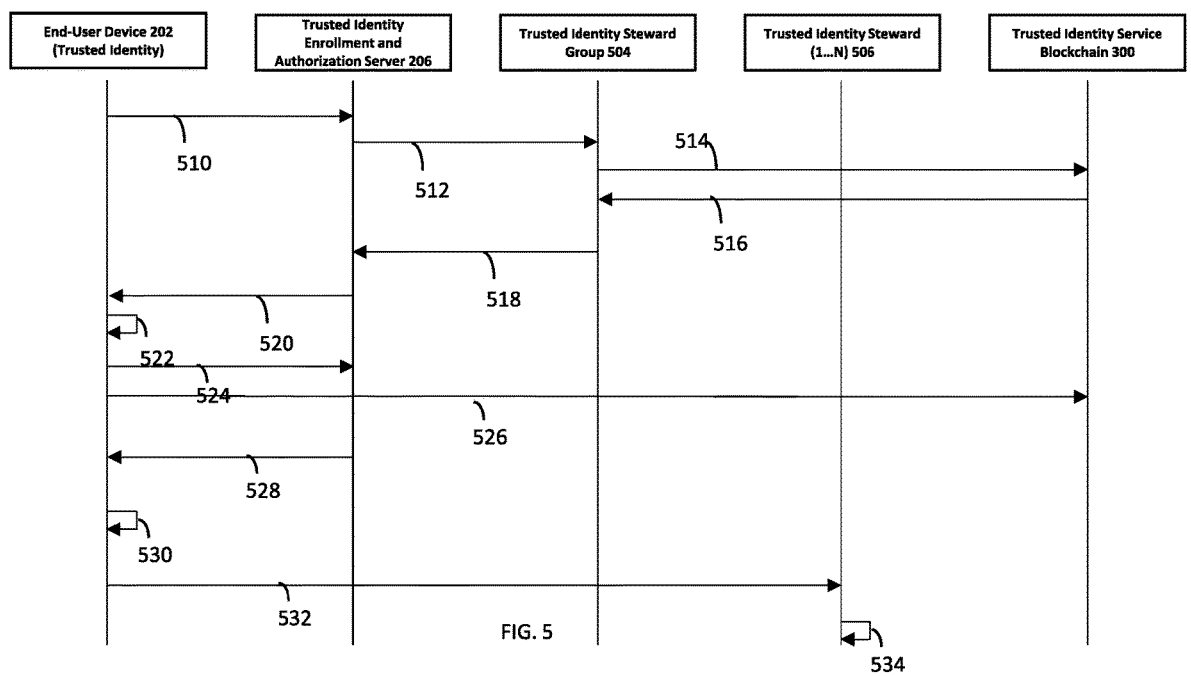
FIG. 5 illustrates the main steps in the Trusted Identity System enrollment process.

FIG. 5 illustrates the Trusted Identity System Enrollment process. The process includes interactions between a trusted identity at end-user device 202, the Trusted Identity Enrollment and Authorization Server 206, a Trusted Identity Steward Group 504, Trusted Identity Stewards 506 and the Trusted Identity Service Blockchain 300. A Trusted Identity requests to enroll in the Trusted Identity System 510. The server 206 validates the request and forwards it 512 to the Steward Group 504. A request for a Protected Data Security Mechanism 514 is applied to the blockchain 300, which returns 516 the Protected Data Security Mechanism details. The Protected Data Security Mechanism details are then forwarded 518 to the server 206, which forwards 520 it to the trusted identity client device 202. The user evaluates and signs 522 the terms of the Protected Data Security Mechanism. The signed Protected Data Security Mechanism details are then returned 524 to the server 206. The signed Protected Data Security Mechanism details (or a representative digital signature or computed hash value) are also posted 526 to the blockchain 300. The server 206 installs, launches or updates software 528 to control the Protected Data. The Trusted Identity at client 202 creates a unique Trusted Identity Steward Group and Protected Data Activation Token for each Trusted Identity Steward 530. This information is then posted 532 to the stewards 506, which store 534 the information.

In one embodiment, an end-user of a Trusted Identity chooses to enroll in a Trusted Identity System (see FIG. 1, FIG. 2, and FIG. 5). This may occur as a manual process by the end-user navigating to a Trusted Identity System's web site and invoking a registration process or it may be automated as part of an end-user installing an application employing the Trusted Identity System functionality within the application. For example, the end-user may download onto an end-user device an application implementing the Trusted Identity Application Software.

In a second enrollment example, the application handles all of the details and performs all of the enrollment functions on behalf of the user; however, it should provide all the necessary disclosures and end-user agreements, as well as, receive the end-user's consent prior to committing the user to the Trusted Identity System processes.

When an end-user enrolls in a Trusted Identity System, the user chooses to join at least one Trusted Identity Steward Group. An end-user may enroll in multiple Trusted Identity Steward Groups. In one embodiment, an end-user may enroll in multiple Trusted Identity Steward Groups that each control the same Protected Data, whereas in another embodiment, such duplicate coverage may be prohibited or prioritized. The purpose of the Trusted Identity Steward Group is to create and manage the (at least one) specific Protected Data Security Mechanism that the end-user will commit to and which will also govern the Protected Data and steps to be performed upon invocation of the Protected Data Security Mechanism Activation Sequence. Each Trusted Identity Steward Group may have multiple Protected Data Security Mechanisms, some of which may be optional. Enrollment in the Trusted Identity System, participation in a Trusted Identity Steward Group, and a commitment to the terms of the Protected Data Security Mechanism are performed by the end-user that will retrieve the Protected Data Security Mechanism from the Trusted Identity Blockchain, as shown in FIG. 6.

Figure 6:
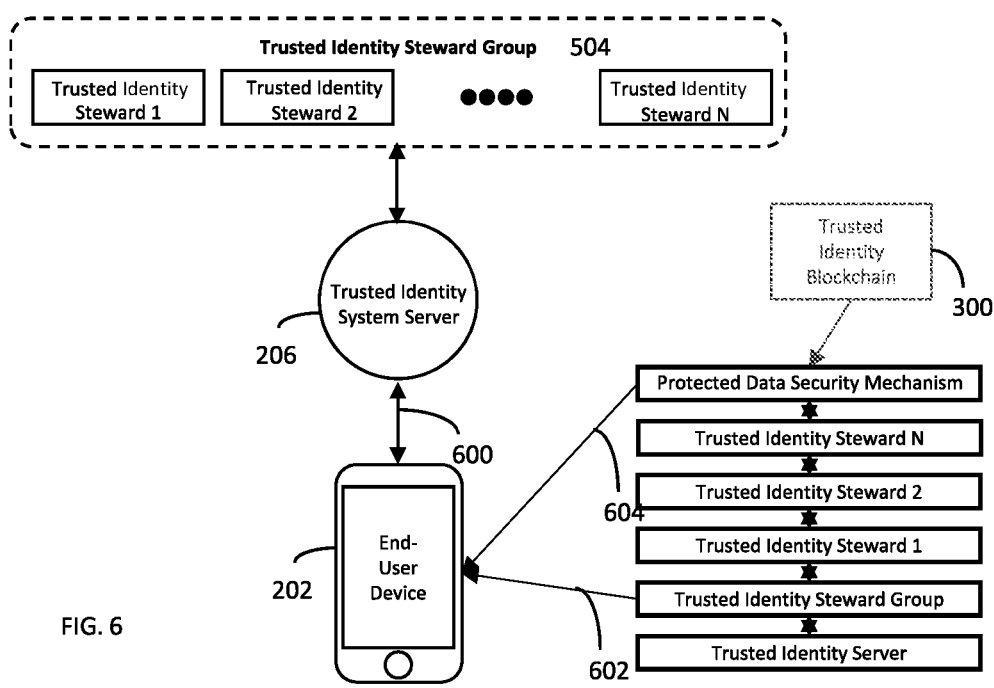
FIG. 6 illustrates some steps in the Trusted Identity Application Software installation and configuration processes.

In particular, FIG. 6 illustrates client device 202 contacting 600 server 206. The client device 202 then accesses 602 the trusted identity steward group of blockchain 300. The client device 202 then retrieves 604 the Protected Data Security Mechanism from blockchain 300.

Figure 7:
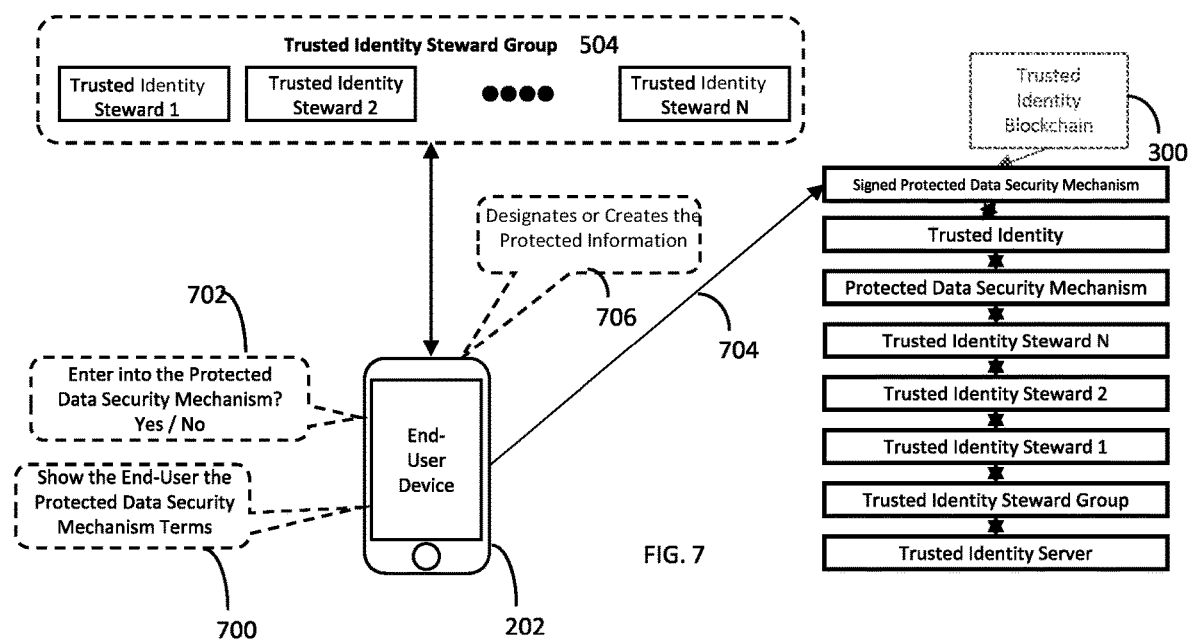
FIG. 7 illustrates some steps in the Trusted Identity Application Software installation and configuration processes.

FIG. 7 illustrates that the client device 202 shows the End-User and Protected Data Security Mechanism Details 700. A prompt 702 is supplied to query the end-user to enter into the terms of the Protected Data Security Mechanism. If the Protected Data Security Mechanism is signed, it is written 704 to the blockchain 300. The user is then prompted to designate or create Protected Data 706.

The Protected Data Security Mechanism is a cryptographic access control mechanism (or specification thereof) that contains all of the details of The Trusted Identity Steward Group and its agreements, such as (but not limited to): which data item(s) constitute the Protected Data, an enumeration of the specific members designated as Trusted Identity Stewards, a designation of which and how many Trusted Identity Stewards are required to consent in order to invoke the terms of a Protected Data Security Mechanism, via the Protected Data Security Mechanism Activation Sequence, the details of what specific steps or actions are taken upon invocation of the Protected Data Security Mechanism Activation Sequence, whether a Trusted Identity is notified when the Protected Data Security Mechanism Activation Sequence is activated (e.g., before, simultaneously, or subsequently), how the Protected Data Security Mechanism's activation is logged (e.g., on the Trusted Identity Blockchain), etc.

Figure 8:
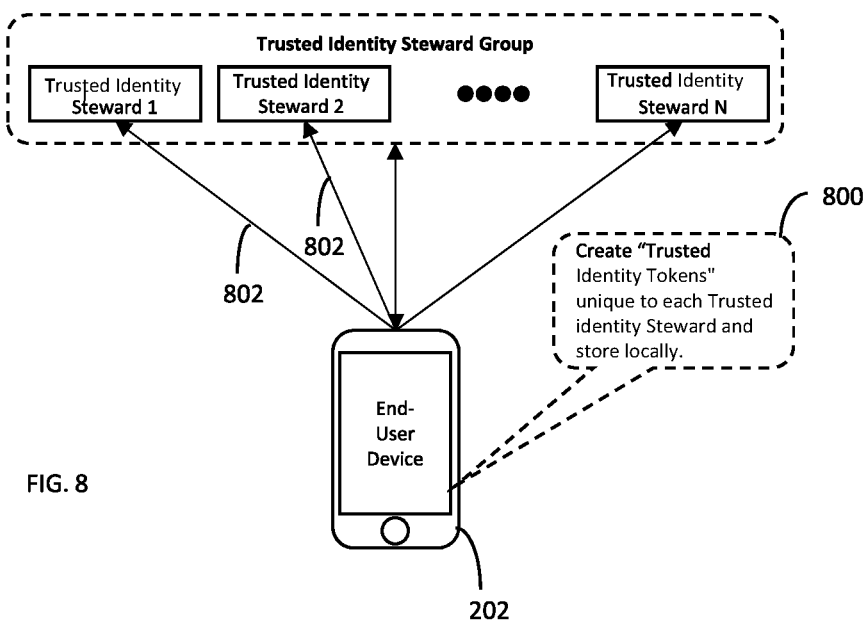
FIG. 8 illustrates some steps in the Trusted Identity Application Software installation and configuration processes.

When an end-user agrees to the terms of the Protected Data Security Mechanism, it designates Protected Data that will be covered under the terms enumerated in the Protected Data Security Mechanism. As part of entering into the terms of the Protected Data Security Mechanism, the end-user authorizes the Trusted Identity System Application Software (contained within the end-user's computing device) to create a Protected Data Activation Token for each of the Trusted Identity Stewards, as shown in FIG. 8. In particular, FIG. 8 illustrates a prompt 800 to create Trusted Identity Tokens unique to each Trusted Identity Steward. The tokens are stored locally. They are also securely transmitted 802 to client devices associated with Stewards in the Steward Group 504. A Trusted Identity Steward, upon receiving a Protected Data Activation Token, will store that token securely to be later used as part of activating the Protected Data Security Mechanism Activation Sequence. In another embodiment, the actual tokens are not stored locally, rather a "token verification mechanism" is stored locally. One of several examples of this is that a token's cryptographic hash is stored instead of storing the token itself. This protects against a hacker stealing the verification tokens. In another embodiment, the data value stored is a "Zero Knowledge Proof" that later validates a token. This could also operate in conjunction with a blockchain or ledge service.

Invocation of the Protected Data Security Mechanism Activation Sequence may take on numerous forms as determined by the members of the Trusted Identity Steward Group. In some embodiments, activating the Protected Data Security Mechanism Activation Sequence may require a 100% consensus of the Trusted Identity Steward Group members, while other embodiments may require a lesser number (e.g., 60%) of Trusted Identity Steward Group members to request the invocation of a Protected Data Security Mechanism Activation Sequence.

Figure 9:
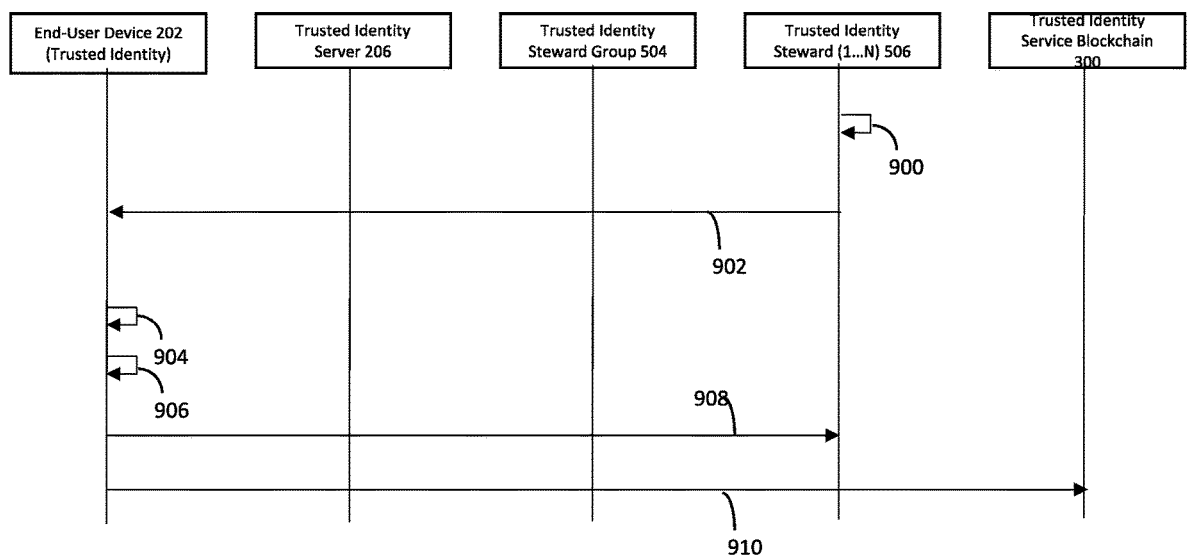
FIG. 9 illustrates the main steps in the Protected Data Security Mechanism Activation Sequence invocation flow.

In order for the Protected Data Security Mechanism Activation Sequence to be invoked, each of the required Trusted Identity Stewards must send a Protected Data Security Mechanism activation request command to the Trusted Identity System Application Software operating on the end-user's computing device within a timeframe mandated by the Protected Data Security Mechanism, as shown in FIG. 9.

FIG. 3 illustrates that each Steward sends a command to invoke the Protected Data Security Mechanism Activation Sequence 900. This results in a command 902 to activate the Protected Data Security Mechanism Activation Sequence, which is sent to client device 202 with the Protected Data Activation Token. The client device 202 receives, validates and stores the Protected Data Activation Token 904. When all of the Protected Data Activation Tokens are received, the Protected Data Security Mechanism Activation Sequence is invoked 906. In some embodiments, invoking the Protected Data Security Mechanism Activation Sequence may result in Personal Information being transmitted 908 to the Trusted Identity Stewards 506. Invocation of the Protected Data Security Mechanism Activation Sequence is logged 910 on the designated Trusted Identity Service Blockchain 300.

Figure 10:
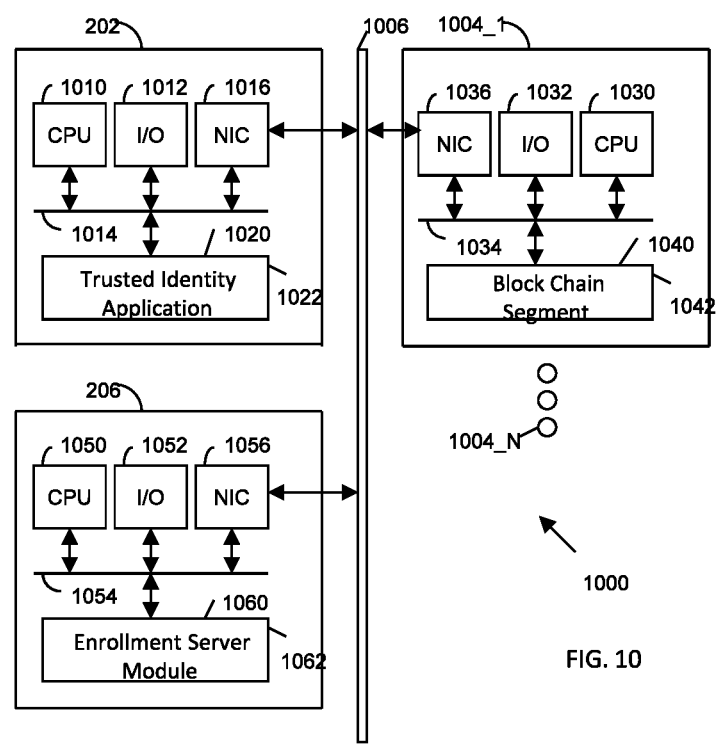
FIG. 10 illustrates a system configured in accordance with an embodiment of the invention.

FIG. 10 illustrates a system 1000 incorporating components disclosed herein. In particular, the figure illustrates an end user device 202, which communicates via network 1006 with servers 1004_1 through 1004_N, which implement the disclosed Trusted Identity Block Chain. The figure also illustrates a Trusted Identity Server 206 connected to the network 1006. The network 1006 may be any combination of wired and wireless networks.

End user device 202 includes a processor (e.g., central processing unit) 1010 and input/output devices 1012, which communicate via a bus 1014. The input/output device 1012 may include a keyboard, mouse, touch display and the like. A network interface circuit 1016 is also connected to the bus 1014 to provide connectivity to network 1060. A memory 1020 is also connected to bus 1014. Memory 1020 stores a trusted identity application 1022, with instructions executed by processor 1010 to implement operations disclosed herein. The end user device 202 may be a computer, tablet, smartphone and the like.

Server 1004_1 includes a processor 1030 connected to input/output devices 1032 via a bus 1034. A network interface circuit 1036 is also connected to the bus 1034. A memory 1040 is also connected to the bus 1034. The memory 1040 stores a block chain segment 1042, with a subset of the information associated with the trusted identity block chain 300.

Trusted Identity Authorization and Enrollment Server 206 includes a processor 1050, input/output devices 1052, a bus 1054 and a network interface circuit 1056. A memory 1060 stores an enrollment server module 1062 to implement operations, such as discussed in connections with FIGS. 1-3 and FIG. 5.

Along with the Protected Data Security Mechanism Activation Sequence invocation command, each Trusted Identity Steward must also provide the unique Protected Data Activation Token that it received when the end-user entered into the terms of the Protected Data Security Mechanism. If the required Trusted Identity Stewards do not all issue Protected Data Security Mechanism invocation request commands, or if they do not pass the correct Protected Data Activation Tokens, then the Trusted Identity System Application Software operating on the end-user's computing device will reject the Protected Data Security Mechanism invocation request(s) and continue to protect the Protected Data within the end-user's computing device. Upon receiving the necessary invocation commands, the required Protected Data Activation Tokens are validated within the timeframe specified by the Protected Data Security Mechanism. The Protected Data Security Mechanism will also invoke the Protected Data Security Mechanism Activation Sequence as specified by the Protected Data Security Mechanism.

Upon invocation of the Protected Data Security Mechanism Activation Sequence, the handling of the Protected Data is done securely and as specified in the Protected Data Security Mechanism. In various embodiments, the Protected Data may be (but is not limited to): securely retrieved (e.g., using methods such as https, transfers over local area networks, direct cable, other protected or encrypted communication pathways, etc.) by only the Trusted Identity Steward Group Manager, securely retrieved by all of the Trusted Identity Steward Group members, securely retrieved by a subset of the Trusted Identity Steward Group members, sent to a designated secure location (e.g., user-owned cloud storage, email, SMS/phone, etc.), or securely transmitted to a designated set of individuals (e.g., email addresses, attorneys, relatives, etc.). The only thing limiting the use and handling of the Protected Data is that the invocation step(s) must be performed as stipulated in the terms of the Protected Data Security Mechanism to which the end-user has previously agreed.

Whether a manual or automated process is being implemented, the end-user designates a particular data item(s) as Protected Data. In another embodiment, an automated application may select the Protected Data and ask for the end-user's consent on its selection and designation. Depending on the application, in an additional embodiment, the application can create the Protected Data to be used. One example of Protected Data may be a symmetric encryption key (or the private key of a public keypair). Selecting a data item to be designated and controlled as Protected Data may be performed by the user (especially if the data item previously existed) or it may be performed by the application implementing the Trusted Identity System Application Software functionality. The Protected Data will remain within the end-user's computing device(s) and/or storage devices that they possess or that they otherwise control. By leaving the Protected Data within the end-user's systems and control, it is not available for use, abuse, or manipulation by non-authorized parties outside of the terms specified in the Protected Data Security Mechanism. Once the Protected Data Security Mechanism has been activated, the terms of the Protected Data Security Mechanism specify the use and handling of the Protected Data, which is normally handled by the Trusted Identity Group Stewards. However, even those authorized Trusted Identity Group Stewards do not have access to the Protected Data until the terms of the Protected Data Security Mechanism have been explicitly and verifiably invoked and even then, only those persons or services explicitly enumerated in the terms of the Protected Data Security Mechanism designated as receivers of the Protected Data will actually receive it. This separation of current control and future access to the Protected Data keeps the Protected Data hidden from unauthorized usage, while also keeping it available for future authorized usage. It also enforces end-user notification requirements, if such are required.

Once the Protected Data has been selected (or created) and the Protected Data Security Mechanism is agreed to, it comes under the control of the Trusted Identity Steward Group and terms of the Protected Data Security Mechanism. It is expected (but not mandatory) that the end-user will be able to use the Protected Data (e.g., encryption key) to perform related functions (e.g., encryption and decryption). However, if the end-user elects to alter the Protected Data (e.g., chooses a new encryption key), then the Protected Data Security Mechanism agreement process will need to be performed again. In some embodiments, changing the Protected Data may occur when the end-user revokes and reissues Protected Data such as an encryption key(s). In this example, when the end-user creates new encryption keys, they either lose access to previously encrypted data or they need to maintain a storage repository of previously-used keys, not for encrypting new data, but for decrypting previously encrypted data. In such embodiments where the user needs to maintain a historical or increasing set of data, they may collectively become the new and updated Protected Data set. Similarly, changes to the Trusted Identity Steward Group, its members, or the Protected Data Security Mechanism requires the end-user to re-commit to a new Protected Data Security Mechanism with its new specific details, terms, conditions, etc.

An end-user may join more than one Trusted Identity Steward Group and thereby be a party to multiple Protected Data Security Mechanisms. Multiple Protected Data Security Mechanism agreements may cover different, identical, or overlapping Protected Data items.

Trusted Identity Group Stewards are a highly-trusted group of actors, since they collectively determine when the Protected Data Security Mechanism Activation Sequence is invoked and how the Protected Data is to be handled. In most embodiments, it is recommended that stewards be selected such that they are unlikely to collude, such as those from a diverse set or those with normally competing interests. A larger set of Trusted Identity Stewards should also decrease the likelihood of a possible adverse collusion contrary to the terms of the Protected Data Security Mechanism. The foregoing recommends choosing Trusted Identity Stewards that are unlikely to collude. In addition to that recommendation, it is presented that the Trusted Identity System processes make use of the Trusted Identity Blockchain to log all activities and attempted activities in a time-sequenced and immutable record (e.g., ledger or blockchain) so that any irregular or illicit activities will be documented and subject to subsequent discovery and action. Since these stewards have unilateral control over the Protected Data, it is important to choose stewards that will adhere to the terms and conditions of the Protected Data Security Mechanism without deviation. When a Trusted Identity Steward Group is created (or modified), new Trusted Identity Stewards may be selected from an existing set of Trusted Identities that are invited (or themselves petition) to join the Trusted Identity Steward Group or end-users (e.g., persons or legal entities) that are invited to become Trusted Identities and subsequently Trusted Identity Stewards of a given group. Upon acceptance of their invitation (or approval of their petition) to join the group, the invited (or petitioning) Trusted Identities become members of the Trusted Identity Steward Group. One (or more) of the Trusted Identity Stewards may be chosen to become the Trusted Identity Steward Group Manager, which handles managerial issues for each group.

The previously described processes enable multiple embodiments that each perform the following:

allow the end-user to maintain control of their Protected Data and to use it for their computing needs keeps the Protected Data within the end-user's computing devices, storage devices, end-user owned or contracted services, etc., so that it is not accessible outside of those devices or services ensure that access to the Protected Data stays within the terms specified in the Protected Data Security Mechanism and previously agreed to by the end-user and the Trusted Identity Stewards prohibits the terms specified in the Protected Data Security Mechanism from being modified without the end-user's knowledge and consent requires the consent of multiple distinct stewards to gain access to the Protected Data, which reduces the likelihood that a malicious employee (of a steward) may gain surreptitious access or make an unauthorized disclosure enable access to Protected Data (as specified in the Protected Data Security Mechanism) even when such is hosted in an otherwise locked computing device In one embodiment of this invention, an end-user installs an application that implements the Trusted Identity System Application Software. In this embodiment, the Protected Data is comprised of a cryptographic private key and the Trusted Identity Stewards comprises: a law enforcement agency, a controlling court of law, and the Trusted Identity System Operator. In an optional embodiment, the Trusted Identity System Application Software installed as a part of the application installed by the end-user on their computing device could serve as a Trusted Identity Steward, which would have the effect of requiring that the end-user be a part of any Protected Data Security Mechanism Activation Sequence invocation requests. When the user installs the application being described in this embodiment, a cryptographic public key pair is created, which comprises a public key that may be freely disseminated and a private key that is protected and held within the end-user's device. When the application connects to the Trusted Identity System, it also downloads and validates a copy of the Protected Data Security Mechanism from the Trusted Identity Blockchain. According to the Protected Data Security Mechanism, this private key is required for access to the Protected Data. The application displays the terms and conditions of the Protected Data Security Mechanism to the user for their review. This includes every specific requirement of terms of the Protected Data Security Mechanism, although it may be reformatted in a user-friendly presentation format for the end-user. One example of a Protected Data Security Mechanism is presented, in JSON notation, in FIG. 4. The application then prompts the end-user for consent to the terms and conditions specified in terms of the Protected Data Security Mechanism, including designating the private key as Protected Data, to which the end-user agrees by digitally signing the Protected Data Security Mechanism. The signed terms of the Protected Data Security Mechanism and the end-user's Trusted Identity are posted to the Trusted Identity Blockchain. Upon signing the Protected Data Security Mechanism, the application generates a unique Protected Data Activation Token for each of the Trusted Identity Stewards and securely conveys it to the corresponding Trusted Identity Steward. At this point, the application software enables the end-user to use the Protected Data to conduct their digital activities. At some future point, this end-user becomes the subject of a law enforcement investigation and the law enforcement agency desires the end-user's private key. Since the application installed by the end-user has implemented the Trusted Identity System Application Software components, the law enforcement entity may not arbitrarily access the Protected Data. As enforced by the Trusted Identity System, the law enforcement agency (itself a Trusted Identity Steward) must comply with the due process steps contained within the Protected Data Security Mechanism, which states that it must convince the specified court of law (also a Trusted Identity Steward) and the Trusted Identity System operator of its need to obtain the Protected Data. After obtaining the consent of the court of law in the form of a subpoena, the law enforcement agency contacts the Trusted Identity System operator (a Trusted Identity Steward) and presents the lawful subpoena. Having received the lawful subpoena, the Protected Data Security Mechanism Activation Sequence may be invoked as described in the terms of the Protected Data Security Mechanism, which was also previously signed by the end-user. As part of this process, the law enforcement agency, the court of law, and the Trusted Identity System operator coordinate a synchronized time to each transmit their own Protected Data Security Mechanism activation Command (together with their unique Protected Data Activation Tokens) to the Trusted Identity Application Software on the end-user's device. Upon reception of all the required invocation commands and Protected Data Activation Tokens, the Trusted Identity Application Software validates the requests and tokens. Upon successful validation, the Trusted Identity Application Software invokes the Protected Data Security Mechanism Activation Sequence. In this embodiment, the Protected Data Security Mechanism Activation Sequence specifies that the Trusted Identity Application Software shall return the Protected Data to each of the named authorized Trusted Identity Stewards. At this point, the law enforcement agency has received the Protected Data, which contains the private key that was authorized by the subpoena. With the private key, the law enforcement agency is able to conduct their court-authorized investigation.

In another embodiment, an end-user installs an application that implements the Trusted Identity System Application Software. In this embodiment, the Protected Data is comprised of a wide range of user-selected or user-defined data sets, such as a database containing user name and password combinations that are used to access websites, online services, personal data stores, and the like. In this embodiment, no law enforcement agencies or courts of law are specified as Trusted Identity Stewards. Additionally, no Protected Data Security Mechanism protections or activation requirements exist for this particular scenario prior to the end-user electing for the Trusted Identity System to control their particular scenario. Given that no agreed upon or signed terms of the Protected Data Security Mechanism exist, the end-user must create a new set of terms to be specified in the Protected Data Security Mechanism (or copy an existing Protected Data Security Mechanism) that meets their specific use case. The Trusted Identity System Application Software may guide the end-user through the creation of the appropriate Protected Data Security Mechanism with terms and conditions that are desirable to the end-user. In one example of this embodiment, the end-user invites four family members (could be more or less and the end-user may choose a variety of persons or entities) to act as Trusted Identity Stewards and enters into the Protected Data Security Mechanism, which (among other terms and conditions) states that each of the Steward's consent is required to initiate the Protected Data Security Mechanism Activation Sequence and then the Protected Data will be securely transmitted to each of the Trusted Identity Stewards. Each of the invited family members enrolls as a Trusted Identity and then accepts an invitation to become a Trusted Identity Steward and, collectively, become the Trusted Identity Steward Group with the end-user specified Protected Data Security Mechanism as their governing agreement. No other Trusted Identity Stewards are chosen. When the end-user installs the application being described in this embodiment, it may either create this username and password database or the end-user may select an existing database created by an external application to be treated as Protected Data. The username and password database may have been created by a separate application. It is expected that the end-user will continue to use this database in their computing activities, add new entries, modify existing entries, and even delete other entries and that such periodic changes will be reflected in the Protected Data Security Mechanism. This database is designated as Protected Data and will remain protected within the end-user's device (unless the user otherwise copies it to another location without the involvement of the Trusted Identity System). The application displays the terms and conditions of the Protected Data Security Mechanism to the end-user for review. Optionally, the terms and conditions of this Protected Data Security Mechanism are displayed to the Trusted Identity Stewards for approval and review as part of acceptance of this role. The application then prompts the end-user for consent to the terms and conditions specified in the Protected Data Security Mechanism; agreement is evidenced by digitally signing the Protected Data Security Mechanism. The signed terms of the Protected Data Security Mechanism and the end-user's Trusted Identity are posted to the Trusted Identity Blockchain. This may be a public posting to serve as a public record or it may be a posting to a private blockchain that protects the end-user's privacy while also creating an immutable time-sequenced record of events. At this point, the application software enables the end-user to use the Protected Data to conduct digital activities. At a future point, as described in terms of the Protected Data Security Mechanism, a Protected Data Security Mechanism activation trigger event occurs, such as the end-user dying or becoming incapacitated. At this point, the Trusted Identity Stewards converse (either digitally, verbally, or in written form) and elect to invoke (as they see fit or as stipulated in the terms of the Protected Data Security Mechanism) the Protected Data Security Mechanism in order to access the username and password database that was designated as Protected Data. As part of this process, each of the family members, acting as the Trusted Identity Stewards, coordinates a synchronized time to each transmit a Protected Data Security Mechanism Activation Sequence invocation command (together with a unique Protected Data Activation Token) to the Trusted Identity Application Software on the end-user's device. Upon reception of all the required invocation commands and Protected Data Activation Tokens, the Trusted Identity Application Software validates the requests and tokens. Upon successful validation, the Trusted Identity Application Software invokes the Protected Data Security Mechanism Activation Sequence. In this embodiment, the Protected Data Security Mechanism Activation Sequence specifies that the Trusted Identity Application Software send the Protected Data to each of the named authorized Trusted Identity Stewards. At this point, the Trusted Identity Stewards (i.e., the designated family members) will have received the Protected Data.

In addition to a username and password database, the end-user may also choose a wide variety of data that is a part of, was generated by, or is being created or used by external third-party applications or processes, to become controlled as Protected Data. Examples of such application data may include (but is not limited to): application settings, voice calling data, email account data, financial data, communications data, web browsing data, game playing data, log data, analytics, etc.

Additional embodiments may employ the above processes to apply the protections, as specified in the Protected Data Security Mechanism, to a wide variety of Protected Data types. Another embodiment may employ the above process descriptions and may designate Protected Data as a database of end-user credit cards or payment account credentials. Another embodiment may employ the above process descriptions to designate Protected Data as an end-user's journal or historical recordings. Another embodiment may employ the above process descriptions and may designate Protected Data as the contents of encrypted messaging communications. Similar to the above embodiments, the described processes can cover Protected Data of a wide variety of types and controlled in a wide variety of custom end-user devised scenarios using the Trusted Identity Application Software.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising:
a network interface circuit to provide connectivity to networked machines;
a processor connected to the network interface circuit; and
a memory connected to the processor and the network interface circuit, the memory storing cryptographically protected data, a data access policy and a steward group specifying individuals to administer the data access policy, the memory storing instructions executed by the processor to:
receive a request to access the cryptographically protected data stored in memory controlled by an end-user,
collect from certain networked machines, via the network interface circuit, authentication tokens from individuals in the steward group,
determine that the authentication tokens satisfy the data access policy to establish a data access state,
supply, in response to the data access state, a decrypted version of the cryptographically protected data to one or more of the networked machines to establish a transaction representing permissioned and conditional access to the protected data stored in the memory controlled by the end-user, and
record the transaction to a distributed ledger associated with at least a subset of the networked machines.

2. The machine of claim 1 wherein the data access policy specifies a minimum number of authentication tokens from individuals in the steward group to establish the data access state.

3. The machine of claim 2 wherein the steward group includes a law enforcement official.

4. The machine of claim 2 wherein the steward group includes a court official.

5. The machine of claim 1 wherein the distributed ledger is a blockchain.

6. The machine of claim 5 wherein the blockchain stores the data access policy, the steward group and a sequence of transactions.

7. The machine of claim 1, wherein the networked machines include a trusted identity enrollment server to supply prompts to selected networked machines associated with candidate steward group participants to enroll in the steward group.

8. The machine of claim 7 wherein the trusted identity enrollment server writes steward group data to the distributed ledger.

* * * * *